US011163095B2

(12) United States Patent
Eble et al.

(10) Patent No.: US 11,163,095 B2
(45) Date of Patent: Nov. 2, 2021

(54) METHOD OF MANUFACTURING AN OPTICAL SYSTEM INCLUDING FORMING A PLURALITY OF DIAPHRAGM APERTURES FROM A SCREENING ELEMENT

(71) Applicant: SICK AG, Waldkirch/Breisgau (DE)

(72) Inventors: Johannes Eble, Waldkirch (DE); Matthias Opfolter, Denzlingen (DE)

(73) Assignee: SICK AG, Waldkirch/Breisgau (DE)

( * ) Notice: Subject to any disclaimer, the term of this patent is extended or adjusted under 35 U.S.C. 154(b) by 2 days.

(21) Appl. No.: 16/679,817

(22) Filed: Nov. 11, 2019

(65) Prior Publication Data

US 2020/0158919 A1 May 21, 2020

(30) Foreign Application Priority Data

Nov. 15, 2018 (DE) .......................... 102018128669.4

(51) Int. Cl.
*G01B 5/00* (2006.01)
*G02B 3/00* (2006.01)
(Continued)

(52) U.S. Cl.
CPC .......... *G02B 3/0012* (2013.01); *G01J 1/0407* (2013.01); *G01J 1/42* (2013.01); *G02B 3/0056* (2013.01)

(58) Field of Classification Search
CPC . G01J 1/0407; G01J 1/42; G01V 8/20; G02B 3/0012; G02B 3/0056; G02B 5/005
(Continued)

(56) References Cited

U.S. PATENT DOCUMENTS

| 5,177,471 A * | 1/1993 | Horibata ................ G01V 1/008 |
|---|---|---|
| | | 250/231.1 |
| 2007/0002453 A1 | 1/2007 | Munro |
| 2016/0131889 A1* | 5/2016 | Morimoto ................ G01J 1/42 |
| | | 250/338.1 |

FOREIGN PATENT DOCUMENTS

| DE | 10 2004 012 271 A1 | 11/2004 |
|---|---|---|
| DE | 10 2017 204 073 A1 | 9/2018 |

(Continued)

OTHER PUBLICATIONS

Office Action dated Nov. 27, 2019 issued in corresponding German Application No. 10 2018 128 669.4.

(Continued)

*Primary Examiner* — Que Tan Le
(74) *Attorney, Agent, or Firm* — Nath, Goldberg & Meyer; Jerald L Meyer (57) ABSTRACT

In a method of manufacturing an optical system that comprises at least one beam deflection unit, at least one diaphragm element, and at least one holder for fixing the beam deflection element and the diaphragm element in a predefined arrangement relative to one another, the beam deflection element and a screening element are provided. The beam deflection element and the screening element are fixed by means of the holder such that the actual arrangement of the screening element relative to the beam deflection element corresponds to the predefined arrangement of the diaphragm element relative to the beam deflection element. The beam deflection element is irradiated by the processing light beams such that after a deflection by the beam deflection element the processing light beams are incident on a functional zone of the screening element and change its optical properties by energy emission.

20 Claims, 9 Drawing Sheets

(51) Int. Cl.
*G01J 1/04* (2006.01)
*G01J 1/42* (2006.01)

(58) Field of Classification Search
USPC .................................................. 250/216, 239
See application file for complete search history.

(56) References Cited

FOREIGN PATENT DOCUMENTS

| DE | 10 2017 116 492 A1 | 1/2019 |
| WO | 90/00459 A1 | 1/1990 |
| WO | 03/069408 A1 | 8/2003 |
| WO | 2014/143234 A1 | 9/2014 |
| WO | 2019/215192 A1 | 11/2019 |

OTHER PUBLICATIONS

Search report dated Apr. 4, 2020, in corresponding application EP 19208226.1.

\* cited by examiner

METHOD OF MANUFACTURING AN OPTICAL SYSTEM INCLUDING FORMING A PLURALITY OF DIAPHRAGM APERTURES FROM A SCREENING ELEMENT

FIELD

The present invention relates to a method of manufacturing an optical system that comprises at least one beam deflection unit, at least one diaphragm element, and at least one holder for fixing the beam deflection element and the diaphragm element in a predefined arrangement relative to one another.

BACKGROUND

Optical systems of said kind are used in a variety of manners to influence the propagation of light, for example for focusing and collimating bundles of light beams. The diaphragm element here serves to bound the cross-sectional area of a bundle of light beams. Optical systems having diaphragm elements are used in different instruments, in particular in optoelectronic sensors such as light sensors, light barriers, light grids, color sensors, or scanners. The diaphragm element generally has a functional zone that differs from the surrounding zones with respect to its optical properties. A diaphragm element can, for example, have a central hole in a non-transparent body or a reflective spot on a transparent body.

It is important for an acceptable performance of the optical system that the predefined arrangement of the beam deflection element relative to the diaphragm element is exactly observed. An exact alignment of the two said elements is particularly important with light grids and the like because they are multi-beam sensors. In addition, a small offset of the diaphragm aperture is accompanied by a noticeable beam offset due to the large light path. Furthermore, light grids, in particular reflection light grids, triangulation light grids, and time of flight light grids (TOF light grids) have either collimated bundles of transmission beams or a small field of vision. If no exact positioning is present between the diaphragm apertures and the beam deflection elements, the collimated bundles of beams are not aligned relative to one another. They can even overlap under certain circumstances. For example, a height of an object to be measured can then not be exactly given so that the performance of the respective light grid is correspondingly small. A positioning step is therefore typically necessary in the manufacture of optical systems.

The positioning of beam deflection elements and/or diaphragm elements by means of manual adjustment is time-consuming and difficult. In addition, the design of adjustable systems is generally complex and voluminous. In multi-beam systems that can e.g. have 100 and more bundles of beams, an individual position is practically not performable with a justifiable effort.

SUMMARY

It is an object of the invention to provide a possibility for a faster and simpler manufacture of an optical system of the initially named kind.

The object is satisfied by a, an optical system with an optoelectronic sensor, that comprises at least one beam deflection unit, at least one diaphragm element, and at east one holder for fixing the beam deflection element and the diaphragm element in a predefined arrangement relative to one another. The beam deflection element and a screening element are provided, in which a lens array, a combination of a lens array and a lens or a combination of a lens array and a mirror optics is provided as the beam deflection element. The beam deflection element and the screening element are fixed by means of the holder such that the actual arrangement of the screening element relative to the beam deflection element corresponds to the predefined arrangement of the diaphragm element relative to the beam deflection element. The screening element is processed by means of processing light beams to form the diaphragm element, thereby forming the diaphragm element having a plurality of diaphragm apertures from the screening element. The beam deflection element is irradiated by the processing light beams such that, after a deflection by the beam deflection element, the processing light beams are incident on a functional zone of the screening element and change its optical properties by energy emission.

The invention provides that
(i) the beam deflection element and a screening element are provided;
(ii) the beam deflection element and the screening element are fixed by means of the holder such that the actual arrangement of the screening element relative to the beam deflection element corresponds to the predefined arrangement of the diaphragm element relative to the beam deflection element; and
(iii) the screening element is processed by means of processing light beams to form the diaphragm element; wherein
(iv) the beam deflection element is irradiated by the processing light beams such that after a deflection by the beam deflection element the processing light beams are incident on a functional zone of the screening element and change its optical properties by energy emission.

In accordance with the invention, the diaphragm element is therefore not provided as a complete component and aligned relative to the beam deflection element, but a precursor in the form of the screening element is rather fixed together with the beam deflection element in the desired position and is only processed to completion in the fixed state. The functional zone, that is the diaphragm hole, for example, is here produced exactly where the fixed beam deflection element directs the processing light beams. In the operation of an optical system manufactured in this manner, the functional zone is thus exactly coordinated with the beam deflection element. The fixing is preferably no longer released after the manufacture of the optical system. This means that the optical path is practically identical in the manufacture and in operation. A subsequent positioning of the diaphragm element or of the beam deflection element is thus not required.

On the fixing of the beam deflection element and of the screening element in step (ii), an exact positioning of the screening element transversely to the optical axis of the beam deflection element is not necessarily required since the diaphragm aperture that is decisive for the function of the optical system is only prepared or produced in step (iv). It is, however, desirable that the screening element is relatively exactly positioned with respect to its position on the optical axis of the beam deflection element. Such a restriction to the exact axial positioning enables a particularly simple manufacture.

The correspondence named in step (ii) of the actual arrangement of the diaphragm element and of the screening element in each case relative to the beam deflection element therefore includes an axial correspondence that is as precise as possible, that is preferably exact, of the lateral arrangement, in each case within the framework of the production accuracy.

A converging optics is preferably provided as the beam deflection element in step (i). A converging optics, that is, for example, a converging lens or an objective, focuses the processing light beams on a relatively small spot and thus produces a high local radiation intensity that facilitates the change of the optical properties of the functional zone.

To provide collimated transmission and/or received beam bundles or for a small field of vision, a diaphragm element having a diaphragm diameter of approximately 50 μm to approximately 200 μm and/or a converging lens having a focal length of approximately 10 mm can in particular be provided.

The beam deflection element and the screening element can in particular be fixed by means of the holder in step (ii) such that the screening element is at least approximately arranged in a focal plane of the converging optics. When irradiating a parallel bundle of processing light beams onto the converging optics, a particularly small functional zone is produced in this embodiment, namely substantially restricted to the focal spot produced by the converging optics. It has been found that diaphragm elements can be formed in this manner that have diaphragm aperture or pinholes of 0.5 mm diameter or less.

A diaphragm aperture is preferably produced using this method in accordance with the invention whose diameter amounts to at least 5 μm and at most 1 mm, particularly preferably at least 20 μm and at most 200 μm. In general, however, smaller and larger diameters are possible depending on the application.

The diaphragm shape given by the functional zone can in particular be circular, elliptical, rectangular, cruciform, or annular. The diaphragm element can furthermore be composed of a plurality of single diaphragms.

The geometry of the functional zone, in particular of the diaphragm aperture, can be changed as desired, in particular by a location change of the processing light beams, by a change of angle of the processing light beams, and/or by a change of the focus of the processing light beams, for example by means of a processing laser that has a variable focusing unit.

In step (i), a lens, a lens array, a mirror optics, or a combination thereof can be provided as the beam deflection element A lens or a lens array of plastic, for example of polymethyl methacrylate (PMMA) or of a polycarbonate (PC) can in particular be provided. The use of a plastic with small internal absorption (small volume absorption) is advantageous. In principle, a lens of glass can also be considered. In particular a gold-coated plastic part can be provided as the mirror optics. Furthermore, a lens or a lens array having an anti-reflective layer applied thereto can be provided. The anti-reflective layer can be optimized with respect to the processing light beams and/or with respect to the light beams provided for the operation of the optical system in accordance with its intended purpose.

In step (ii), the beam deflection element and the screening element are preferably fixed by means of the holder, preferably a one-part holder, such that a fixed connection results between the beam deflection element and the screening element. The fixed connection can be designed for a permanent fixing. The beam deflection element and the screening element can be immobile relative to one another and/or non-releasably coupled to one another due to the fixed connection.

Since the holder does not necessarily have to be designed for an adjustment possibility, it can be of a particularly simple design. A component of tubular form, of the form of a bundle of tubes, of the form of a section, or of the form of a grid composed of plastic or metal can in particular be provided as the holder. The holder can additionally have advantageous optical properties. For example the holder can have a surface with small remission.

In step (i), a single-piece component, preferably of plastic or metal, can be provided at which the screening element and the holder are formed as sections. This enables a particularly simple construction in which the screening element does not have to be separately mounted in the holder, but is actually held thereat.

The beam deflection element and the screening element can be fixed by means of the holder in step (ii) such that the beam deflection element and the diaphragm element are coaxially arranged with respect to an optical axis. That is, an optical system can be manufactured in which the functional zone, e.g. the diaphragm aperture, of the diaphragm element is located on the optical axis of the beam deflection element. Such optical system are installed in a number of devices and instruments, in particular in optoelectronic sensors. If the application should require, the beam deflection element and the screening element and to this extent also the diaphragm element to be formed can, however, also be arranged in an offset or tilted manner.

The processing light rays are preferably produced by a laser system. A material change can be carried out in different manners at the screening element using a laser system, as is generally known in the field of material processing. In particular the method of laser ablation has been found to be advantageous.

A laser system can in particular be used that comprises a solid state laser.

The laser system preferably comprises a picosecond laser or a femtosecond laser.

In step (i), a plurality of separate beam deflection elements can be provided that are fixed by means of a common holder in step (ii). This enables a simplified manufacture of multi-beam optical systems such as are required for multi-beam sensors such as sensing light grids or reflection light grids. Due to the fixing in the common holder, all the bundles of beams are aligned in a correct manner relative to one another in the operation of a corresponding sensor. The beam deflection elements can in particular be fixed such that the respective optical axes are in parallel with one another after the forming of the diaphragm elements. Furthermore, a plurality of beam deflection elements can be provided in step (i) that are integrated in a common beam deflection component. For example, a lens array having a plurality of parallel lenses can be provided.

A diaphragm element having a plurality of functional zones, that is, for example, a diaphragm element having a plurality of diaphragm holes, can be formed by means of the arrangement of a plurality of fixed beam deflection elements. For this purpose, the beam deflection elements can be irradiated with the processing light beams simultaneously or after one another. For a sequential irradiation, the holder having the beam deflection elements and the screening element can in particular be displaced relative to a processing light source by means of a positioning stage or a travelable processing light source can be used. A simultaneous irradiation of all the functional zones can, however, also take place and a beam splitting can be provided for this purpose.

An at least substantially non-transparent starting element is preferably provided in step (i), with a transparency or partial transparency being produced by the deflected processing light beams in step (iv). The transparent or partially transparent functional zone forms a diaphragm aperture of the diaphragm element.

The transparency or partial transparency can be produced by a removal of material by means of the processing light beams in step (iv). This means that non-transparent material can be removed by energy emission from the screening element. This is, for example, relatively easily to effect using solid state laser systems.

The transparency or partial transparency can in particular be produced in step (iv) by laser cutting and/or by laser drilling of an opening in the screening element. In this manner, a pinhole, a slit diaphragm, or the like can be produced such as is required in a large number of optical devices.

An embodiment of the invention provides that an at least substantially transparent carrier having an applied non-transparent layer, in particular a metal layer, is provided as the screening element in step (i) and the transparency or partial transparency is produced by an at least partial removal of the non-transparent layer in step (iv). The non-transparent layer can here be designed as a vapor deposited thin film so that relatively little energy emission is required for the removal. A plate-like carrier of glass or plastic having a vapor deposited chromium layer can in particular be provided as the screening element.

A glass substrate having an applied absorbent layer, in particular a black chromium layer, a black titanium layer, or a titanium-aluminum nitride layer is particularly preferably provided as the screening element. The layer thickness preferably amounts to at least 20 nm and at most 2000 nm, particularly preferably at least 100 nm and at most 500 nm. This, on the one hand, ensures a sufficient blocking of the light and, on the other hand, promotes, in particular on a use of a laser ablation process, an ablation of the material by means of laser radiation. The non-transparent layer is preferably located on a side of the screening element facing the beam deflection element.

Provision can be made that an at least substantially transparent carrier having an applied photoresist layer is provided as the screening element in step (i) and that the transparency or partial transparency is produced in step (iv) by activation of the photoresist layer and a subsequent removal of the activated photoresist layer by means of a solvent treatment.

A further embodiment of the invention provides that a photographic film is provided as the screening element in step (i) and the transparency or partial transparency is produced in step (iv) by exposure of the photographic film and optionally by a subsequent development of the photographic film. A positive photographic film is preferably provided. In this case, no wet processes are required so that only a small effort is required to form the diaphragm element.

Generally and also in this embodiment, the invention advantageously enables the implementation of very thin diaphragms.

In accordance with a special embodiment, the processing of the screening element is monitored by an image detection device in step (iii). A camera connected to an image processing system can in particular record the zone of the screening element in which the diaphragm is formed. The recording can then be evaluated to control the processing, in particular the power and/or the exposure time, as required. The reliability and precision of the method can be further increased in this manner.

The invention also relates to a method of manufacturing an optoelectronic sensor that has at least one light transmitter or light receiver and at least one optical system, wherein the optical system comprises at least one beam deflection element, at least one diaphragm element, and at least one holder for fixing the beam deflection element and the diaphragm element in a predefined arrangement relative to one another.

In accordance with the invention, the optical system is manufactured using a method as described above. To manufacture the optoelectronic sensor, the correspondingly manufactured optical system having the light transmitter or light receiver and an electronic control device can be mounted in a sensor housing.

In accordance with an embodiment of the invention, the processing of the screening element is carried out in a partially installed or fully installed state of the optoelectronic sensor. For example, the arrangement of the beam deflection element, screening element, and holder can be provided as a prefabricated optics module and can be fastened to an electronics card comprising the light transmitter or light receiver. The electronics card having the optics module can be installed in a sensor housing before the screening element is processed to form the diaphragm element. This enables a particularly efficient production. The automatic elimination of tolerances of the electronics card and of the sensor housing is of special advantage in diaphragm production.

Provision can be made that the light transmitter or light receiver is screened by a protective element during the processing of the screening element and that the protective element is removed when the forming of the diaphragm element has been concluded. This enables the use of processing light of higher power without having to fear damage to electronic components.

The light transmitter or the light receiver or a light guide connected to the light transmitter or light receiver is preferably arranged directly at the functional zone of the screening element. The installation therefore preferably takes place such that a diaphragm aperture of the diaphragm element is located directly at the light source or at the reception surface.

The invention also relates to an optical system that comprises at least one beam deflection unit, at least one diaphragm element, and at least one holder for fixing the beam deflection element and the diaphragm element in a predefined arrangement relative to one another.

In accordance with the invention, the optical system is manufactured using a method as described above. An optical system in accordance with the invention accordingly has those apparatus features that result from the respective embodiments of the manufacturing method in accordance with the invention.

The invention further relates to an optoelectronic sensor, in particular to a light grid, having at least one light transmitter or light receiver and at least one optical system.

The optoelectronic sensor in accordance with the invention can be a light grid that is designed as a transceiver system and accordingly comprises at least one light transmitter and at least one light receiver in respective separate housings. An optoelectronic sensor in accordance with the invention can, however, also be designed as a reflection light grid that comprises a housing having a light transmitter and a light receiver, and a passive reflector or as a sensing triangulation light grid that has at least one light transmitter and at least one light receiver in a housing and is configured for a direct detection of an object. An optoelectronic sensor in accordance with the invention can furthermore also be designed as a TOF light grid (time of flight light grid) that has at least one light transmitter and at least one light receiver in a housing and is configured for a direct detection of an object by means of a time of flight measurement. An optoelectronic sensor in accordance with the invention preferably comprises at least one light transmitter and at least one light receiver in a common housing. An optoelectronic sensor in accordance with the invention is particularly preferably configured as a reflection light grid or as a sensing light grid.

The optical systems is designed as indicated above in accordance with the invention.

Further developments of the invention are also set forth in the dependent claims, in the description and in the enclosed drawing.

BRIEF DESCRIPTION OF THE DRAWINGS

The invention will be explained in the following by way of example with reference to the drawing. The representations in the Figures are not to be understood as to scale.

DETAILED DESCRIPTION

Figure 1:
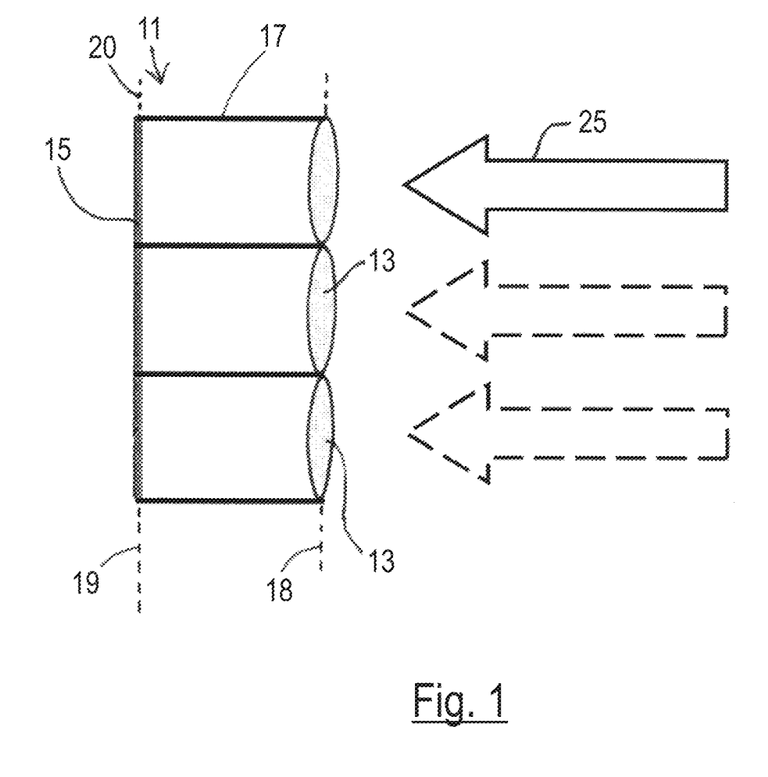
FIG. 1 is a schematic diagram of an arrangement for a manufacture in accordance with the invention of an optical system.

FIG. 1 shows an optics module 11 that comprises an arrangement of lenses 13 and a screening element 15 in the form of a transparent plate. The arrangement of lenses 13 and the screening element 15 are fixed by means of a holder 17 in a predefined arrangement relative to one another. In the embodiment shown, the arrangement is such that the lenses 13 are arranged at least substantially in a common lens plane 18 and a plate plane 19 of the screening element 15 extends in parallel with the lens plane 18. The lenses 13 and the screening element 15 can be adhesively bonded and/or clamped in the holder 17. The holder 17 is preferably a simple component of plastic or metal. As shown, the lenses 13 are configured as converging lenses that each have a focal plane 20. The plate plane 19 coincides with the focal planes 20. In principle, the lenses 13 could also have different focal lengths 20.

An embodiment of a method in accordance with the invention of manufacturing an optical system provides that, after a provision of the optics module 11 shown in FIG. 1, a bundle 25 of at least substantially parallel processing light beams is directed from the side of the optics module 11 remote from the screening element 15 to one of the lenses 13. A laser system, not shown, is preferably used to produce the bundle 25 of processing light beams.

Figure 2:
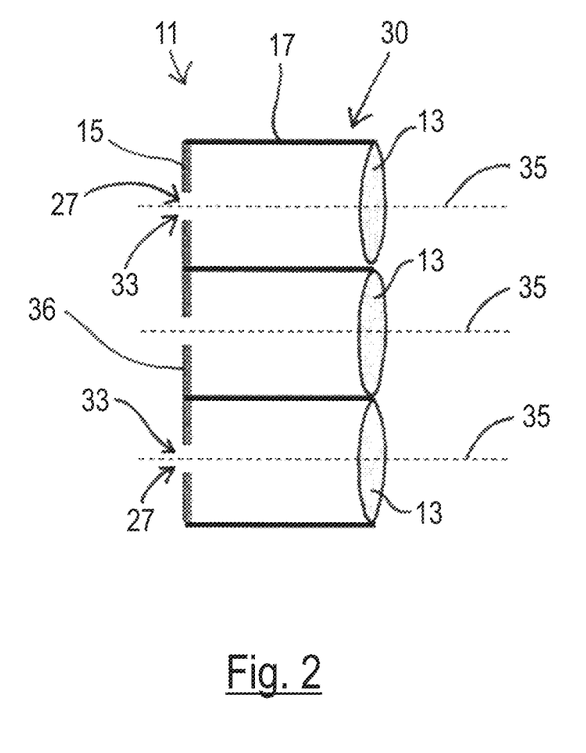
FIG. 2 shows an optical system that has been manufactured by a method in accordance with the invention.

The lens 13 focuses the processing light beams on a focal spot. The focal spot is located on the screening element 15 and has a high radiation intensity. The radiation intensity of the processing light beams is in particular selected as so high that a material removal takes place in the zone of the focal spot. The irradiation is carried out such that, as recognizable in FIG. 2, an opening 27 is produced in the screening element 15 whose size approximately corresponds to the size of the focal spot. After completion of the opening 27, the laser system is moved relative to the optics module 11 such that the bundle 25 of processing light beams is incident on a different lens 13. In this manner, a respective opening 27 is produced using each of the lenses 13 and the optical system 30 shown in FIG. 2 is thereby manufactured. The openings 27 form functional zones—and indeed diaphragm apertures 33 in the embodiment shown. They are each located on the optical axes 35 of the lenses 13. This means that a diaphragm element 36 having a plurality of diaphragm apertures 33 is formed from the screening element 15. In general, the production of the diaphragm apertures 33 can also take place synchronously on a splitting of the processing light beams.

Figure 3:
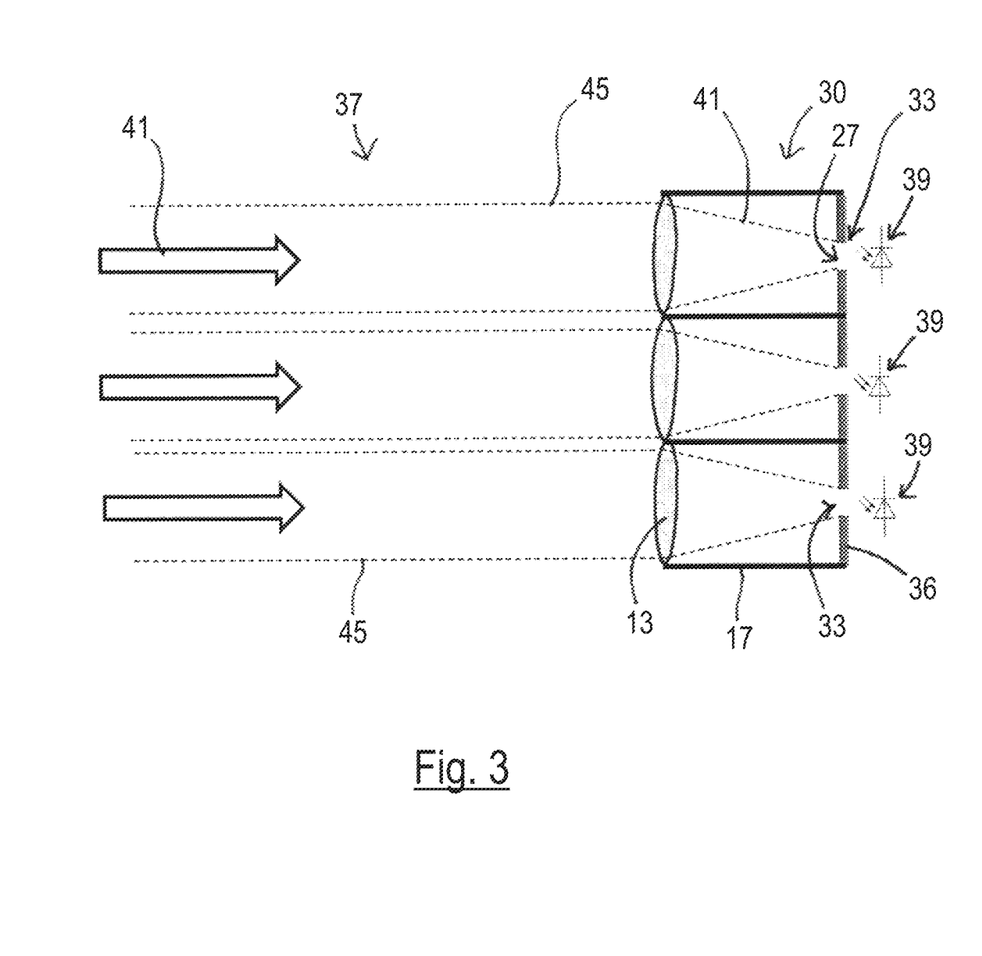
FIG. 3 shows a first embodiment of an optoelectronic sensor in accordance with the invention that has been manufactured by a method in accordance with the invention.

FIG. 3 schematically shows an optoelectronic sensor 37 in which the optical system 30 shown in FIG. 2 is installed. The optoelectronic sensor 37 has an arrangement of light receivers 39 for receiving received light beams 41. The light receivers 39 can be formed as simple photodiodes or as spatially resolving detectors. The light receivers 39 are preferably applied to an extension card, not shown, that is accommodated, together with the optical system 30, in a sensor housing, likewise not shown, of the optoelectronic sensor 37. As shown, the light receivers 39 are each located directly in front of the diaphragm apertures 33. The light sensitive surfaces of the light receivers 39 are preferably each larger than the associated diaphragm aperture 33. Tolerances of the electronics card and temperature effects that act on the component length are thereby compensated. The received light zones 45 of the light receivers 39 are exactly aligned relative to one another. It is in another respect not necessary to align the bundles 25 (FIG. 1) of processing light beams with a maximum precision because the spatial resolution takes place via the light receivers 39.

Figure 4:
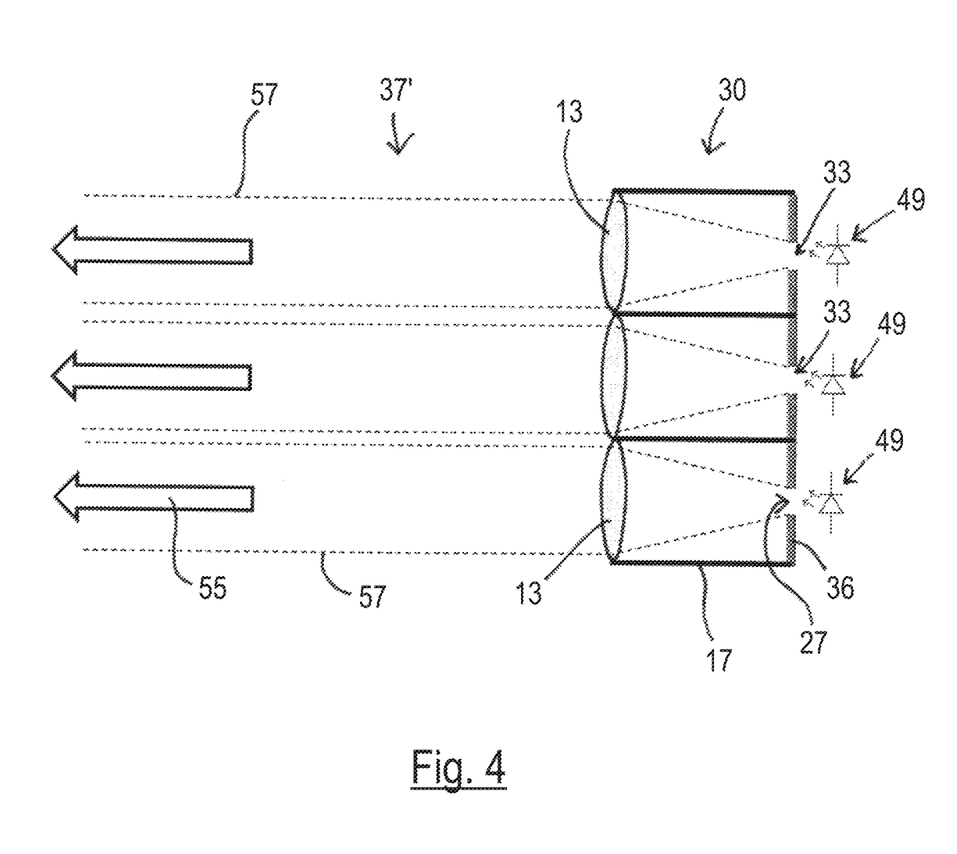
FIG. 4 shows a second embodiment of an optoelectronic sensor in accordance with the invention that has been manufactured by a method in accordance with the invention.

The transmission arrangement of an alternatively designed optoelectronic sensor 37' in which the optical system 30 shown in FIG. 2 is installed is shown in FIG. 4. The optoelectronic sensor 37' shown in FIG. 4 has, instead of an arrangement of light receivers, an arrangement of light transmitters 49 for transmitting transmitted light beams 55. The light transmitters 49 can be configured as light emitting diodes or as laser diodes. The light transmitters 49 are applied to an extension card that is accommodated, together with the optical system 30, in a sensor housing of the optoelectronic sensor 37'. As shown, the light transmitters 49 are each located directly at the diaphragm apertures 33. The lenses 13 collimate the transmitted light beams 55 to parallel beam bundles 57 that are exactly aligned relative to one another.

Figure 5:
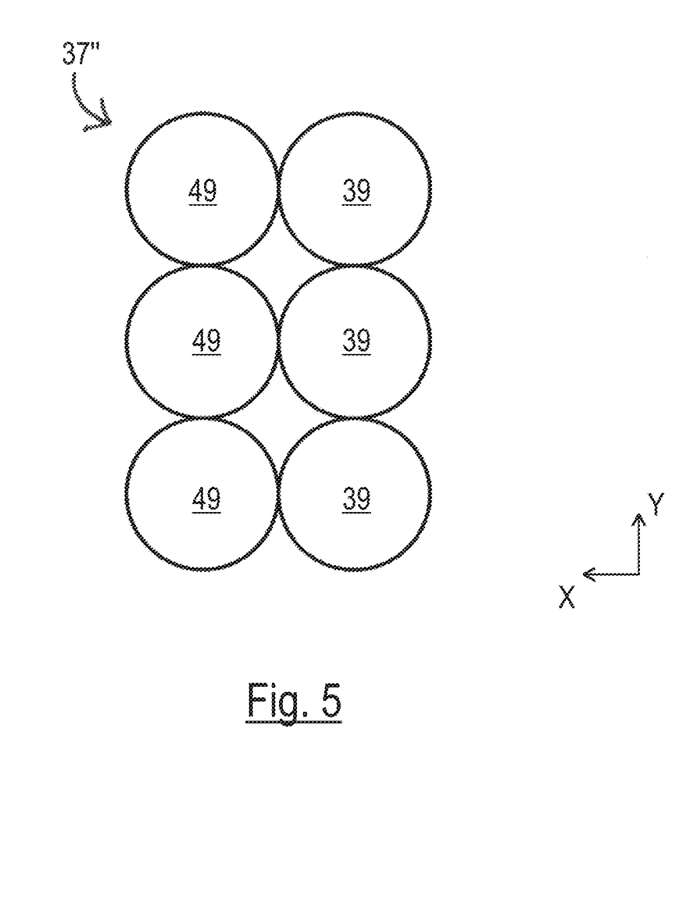
FIG. 5 shows a third embodiment of an optoelectronic sensor in accordance with the invention that has been manufactured by a method in accordance with the invention in a front view.

It is understood that there are a plurality of further application possibilities of aligned received light zones 45 (FIG. 3) and of aligned parallel beam bundles 57 of transmitted beams 55 (FIG. 4). The subject matter of FIG. 5 is a further optoelectronic sensor 37" designed in accordance with the invention. The plan view of the light transmitters 49 and light receivers 39 arranged in combination is shown in FIG. 5. This optoelectronic sensor 37" is designed as a reflection light grid and has an arrangement of light transmitters 49 and an arrangement of light receivers 38 arranged next to them. The light transmitters 49 and the light receivers 39 are preferably accommodated in a sensor housing, not shown. The light receivers 39 receive the light transmitted by the light transmitters 49 after it has been reflected by a reflector or by an object.

Figure 6:
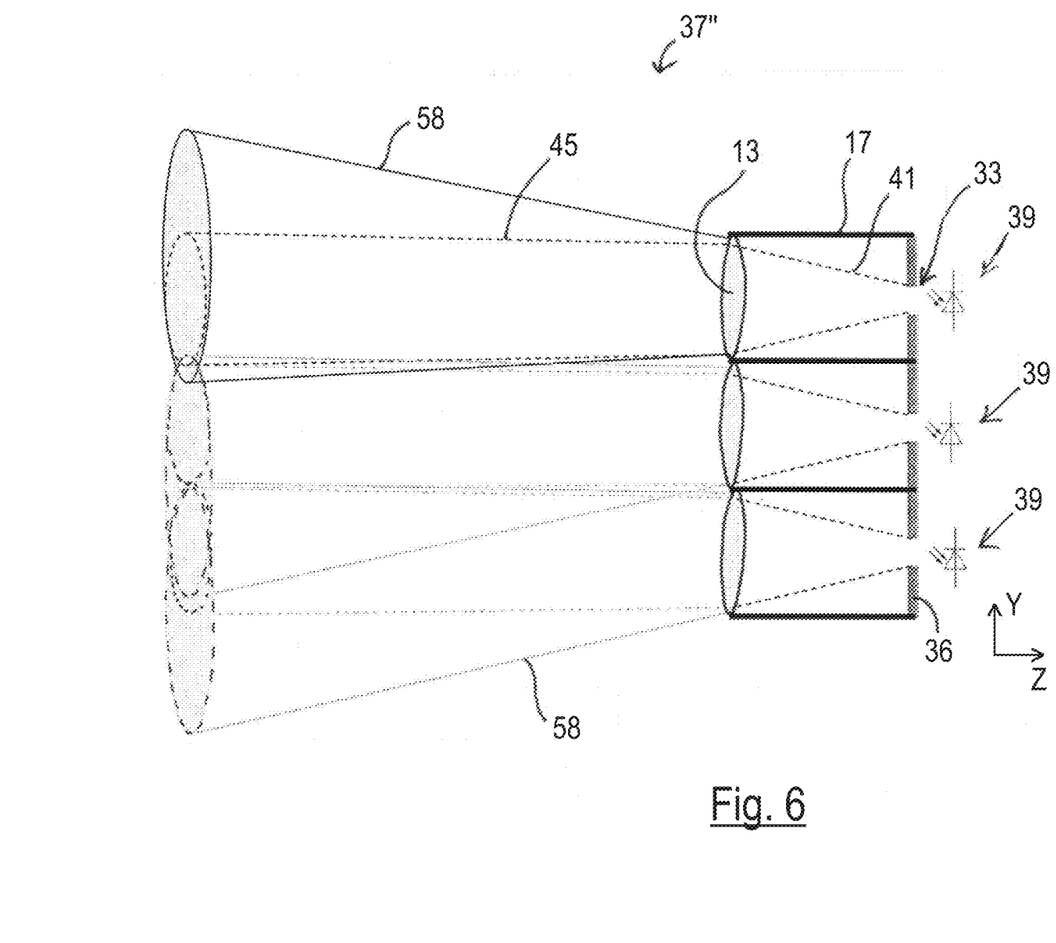
FIG. 6 shows the optoelectronic sensor in accordance with FIG. 5 in a side view.

As can be recognized in the side view in accordance with FIG. 6, the received light zones 45 are exactly aligned due to the exactly positioned diaphragm apertures 33. The performance of the optoelectronic sensor 37" is therefore then itself sufficiently high if the transmitted beam bundles 58, as shown, squint to a certain 30 degree relative to one another (the associated light transmitters 49 are not shown in FIG. 6). This means that the demands on the positioning precision can be reduced at the transmitter side in order thus to save costs. Under certain circumstances, a conventional manufacturing method can be used at the transmitter side. An advantage with respect to an embodiment in which a manufacturing method in accordance with the invention is used at the transmitter side and a conventional manufacturing method is used at the receiver side is that the energy loss is only small.

Figure 7:
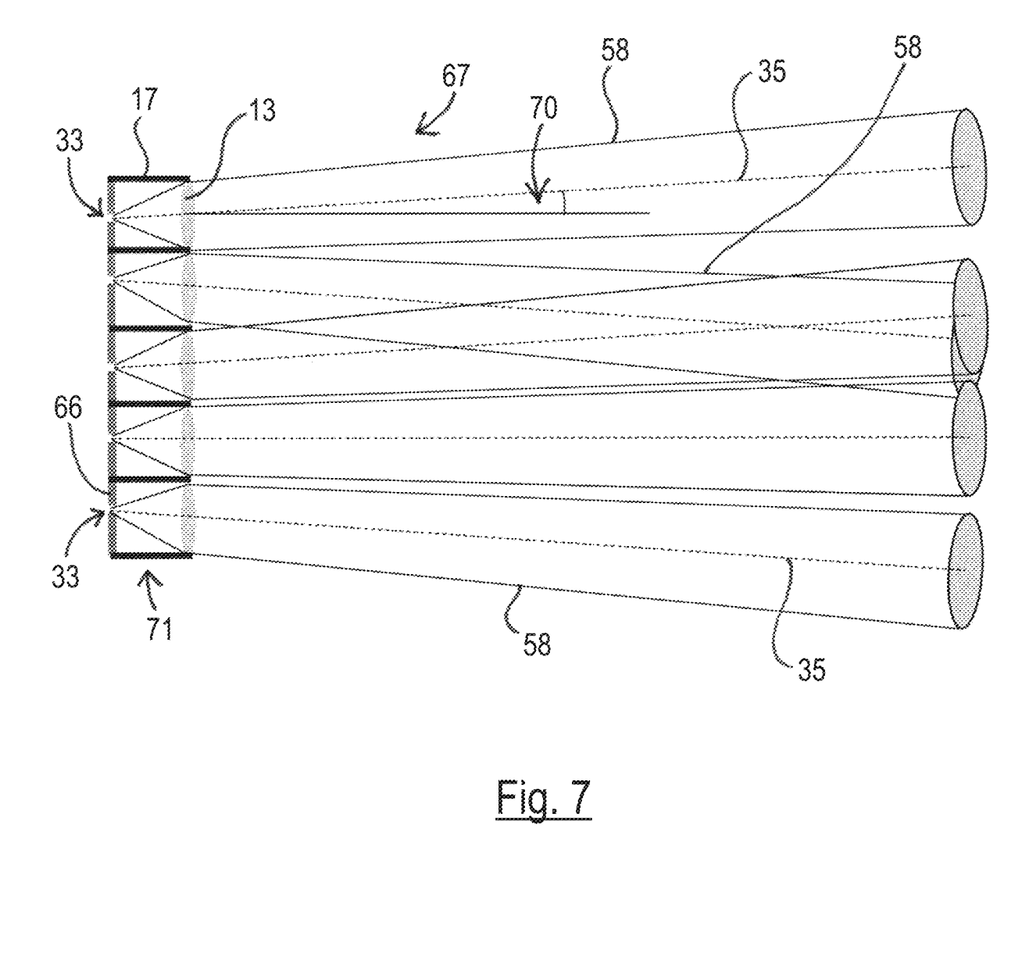
FIG. 7 shows an optoelectronic sensor manufactured in accordance with the prior art in a side view.

An optoelectronic sensor 67 comprising an optics module 71 manufactured in a conventional manner is shown in FIG. 7. The diaphragm elements 66 and the lenses 13 are here designed as separately produced injection molded components. Due to positional tolerances, without an adjustment, there is a squint of the optical axes 35 relative to one another, as is indicated by the squint angle 70. The transmitted beam bundles 58 can even intersect. Also, seen in absolute terms, that is with respect to the sensor housing, not shown, an unwanted squint occurs. Typical lateral positional tolerances between the lenses 13 and the diaphragm apertures 33 amount to ±0.1 mm or more. At a typical focal length of 10 mm, this results in a squint angle of ±0.6°. At a distance of approximately 1 m from the conventional optoelectronic sensor 67, shifts of the light spots of ±10 mm occur in this case, which is accompanied by a noticeable power impairment of the optoelectronic sensor 67.

An embodiment of the invention that is not shown provides an autocollimation arrangement in which the light transmitters and the light receivers are arranged coaxially.

Since the lenses 13 are fixedly connected to the later diaphragm element 36 via the holder 17 during manufacture and since the laser system provided for the processing can be aligned with high accuracy relative to the optics module 11, the diaphragm apertures 33 and the lenses 13 are precisely aligned to one another in an optical system 30 manufactured in accordance with the invention. Positional and shape tolerances of the lenses 13 in particular have hardly any effect on the performance of the respective optoelectronic sensors 37, 37', 37". The centers of the diaphragm apertures 33 are always relatively exactly disposed on the optical axes 35 (FIG. 2). If a plurality of optics modules 11 are positioned relative to one another in the sensor housing, received light zones 45 and transmitted parallel beam bundles 57 can be exactly aligned to one another. The performance of an optoelectronic sensor 37, 37', 37", in particular with respect to range, reflection safety, and simultaneous scan capability, can hereby be considerably increased.

Figure 8:
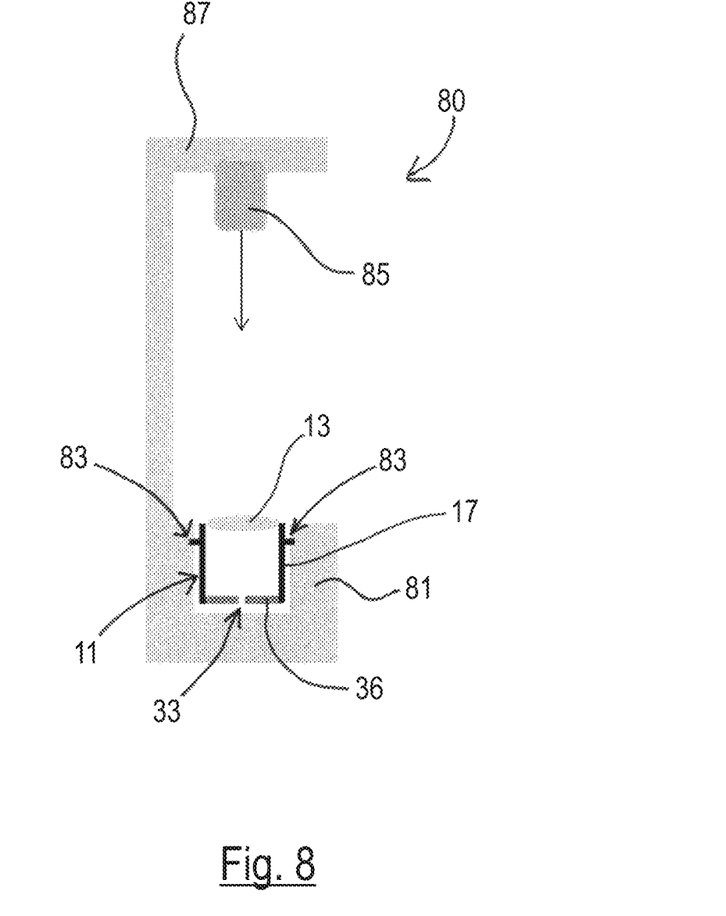
FIG. 8 shows an apparatus that is configured to carry out a method in accordance with the invention for manufacturing an optical system.

FIG. 8 shows an apparatus 80 with which a method in accordance with the invention can be carried out. The apparatus 80 comprises a module receiver 81 in which an optics module 11 is fixed while using modular alignment elements 83. The modular alignment elements 83 are, as shown, arranged at an outer side of the holder 17 of the optics module 11. They can, for example, be designed for a mechanical alignment with corresponding adjustment screws. A processing laser 85 is positionable with respect to the module receiver 81 by means of a positioning system 87. To form a diaphragm element 36, the processing laser 85 is aligned and activated in a desired manner until the laser beam focused by the lens 13 has produced a diaphragm aperture 33.

Figure 9:
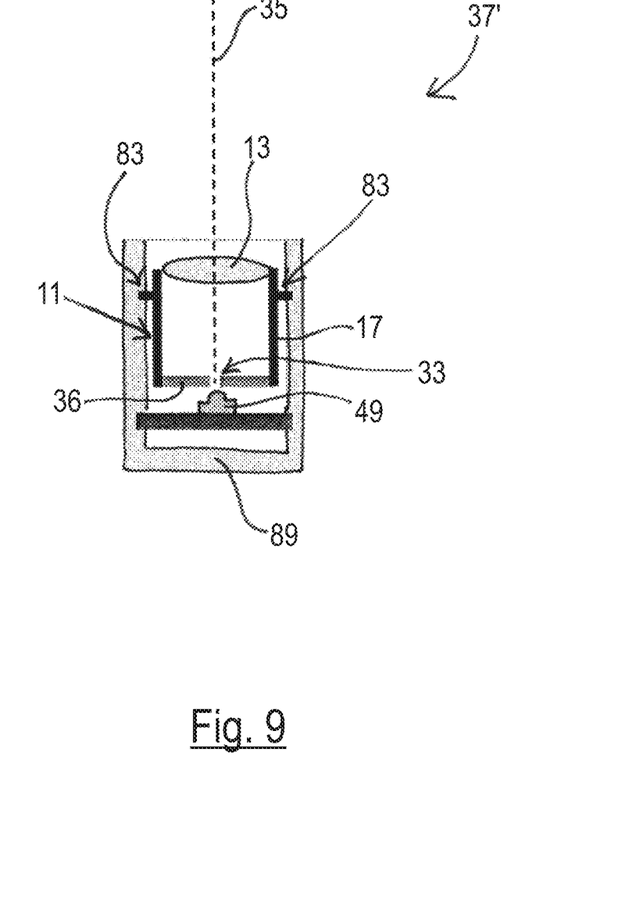
FIG. 9 shows a fourth embodiment of an optoelectronic sensor in accordance with the invention that has been manufactured by a method in accordance with the invention.

As recognizable in FIG. 9, the finished optics module 11 is preferably fixed in the same manner while using the modular alignment elements 83 in a sensor housing 93 as before in the module receiver 81 (FIG. 8). An exact alignment of the lens 13, of the diaphragm aperture 33, and of the sensor housing 89 relative to one another is thereby ensured. It is advantageous for this purpose for the sensor housing 89 and the module receiver 81 to have substantially the same inner dimensions.

Instead of openings 27, other kinds of functional zones can also be produced on a screening element 15 by energy emission of the processing light beams that differ with respect to their optical properties from zones surrounding them. For example, a transparent plate having a vapor deposited metal layer could be provided as the screening element 15, with transparent zones being produced as diaphragm apertures 33 by selective removal of the metal layer. Alternatively, a transparent carrier having an applied photoresist layer could be provided as the screening element 15, with transparent zones being produced as diaphragm apertures 33 by selective activation of the photoresist layer and a subsequent solvent treatment. A further alternative is the provision of a photographic film as the screening element 15, with transparent zones being produced as diaphragm apertures 33 by a selective exposure and optionally a subsequent development of the photographic film.

It is generally also possible by means of a method in accordance with the invention to form non-transparent zones instead of diaphragm apertures 33 on a transparent carrier and so to manufacture pinholes or pin mirrors. In addition, instead of lenses 13, other optical components can also be provided that deflect light beams in some form, for example objectives or mirror optics.

Optical systems manufactured in accordance with the invention cannot only work with collimated beam bundles as shown in FIGS. 3, 4, and 7, but also with convergent or divergent beam bundles.

The invention enables the manufacture of diaphragms of a variety of kinds that are positioned with low tolerance with respect to the optical axes of lenses or similar optics. The invention furthermore supports the preparation of individual diaphragm shapes and diaphragm sizes. The principles of the invention particularly come into effect with multi-beam sensors such as light grids because all the transmitted beam bundles and all the received light zones can be exactly aligned to one another, which in particular enables simultaneous operation of all the channels with a corresponding increase of the switching speed.

REFERENCE NUMERAL LIST 11 optics module
13 lens
15 screening element
17 holder
18 lens plane
19 plate plane
20 focal plane
25 bundle of processing light beams
27 opening
30 optical system
33 diaphragm aperture
35 optical axis
36 display element
37, 37', 37" optoelectronic sensor
39 light receiver
41 received light beams
45 received light zone
49 light transmitter
55 transmitted light beams
57 parallel beam bundles
58 transmitted beam bundles
66 diaphragm element
67 optoelectronic sensor
70 squint angle
71 optics module
80 apparatus
81 module receiver
83 module alignment element
85 processing laser
87 positioning system
89 sensor housing

The invention claimed is:

1. A method of manufacturing an optical system that comprises at least one beam deflection unit, at least one diaphragm element, and at least one holder for fixing the beam deflection element and the diaphragm element in a predefined arrangement relative to one another, wherein
   (i) the beam deflection element and a screening element are provided, wherein a lens array, a combination of a lens array and a lens or a combination of a lens array and a mirror optics is provided as the beam deflection element;
   (ii) the beam deflection element and the screening element are fixed by means of the holder such that the actual arrangement of the screening element relative to the beam deflection element corresponds to the predefined arrangement of the diaphragm element relative to the beam deflection element;
   (iii) the screening element is processed by means of processing light beams to form the diaphragm element; and
   (iv) the beam deflection element is irradiated by the processing light beams such that, after a deflection by the beam deflection element, the processing light beams are incident on a functional zone of the screening element and change the optical properties of the functional zone by energy emission, thereby forming the diaphragm element having a plurality of diaphragm apertures from the screening element.

2. The method in accordance with claim 1, wherein a converging optics is provided as the beam deflection element in step (i).

3. The method in accordance with claim 2, wherein the beam deflection element and the screening element are fixed by means of the holder in step (ii) such that the screening element is at least approximately arranged in a focal plane of the converging optics.

4. The method in accordance with claim 1, wherein in step (i), a lens, a lens array, a mirror optics, or a combination thereof is provided as the beam deflection element.

5. The method in accordance with claim 1, wherein in step (ii), the beam deflection element and the screening element are fixed by means of the holder such that a fixed connection results between the beam deflection element and the screening element.

6. The method in accordance with claim 1, wherein in step (i), a single-piece component is provided at which the screening element and the holder are formed as sections.

7. The method in accordance with claim 1, wherein the processing light beams are produced by a laser system.

8. The method in accordance with claim 1, wherein in step (i), a plurality of separate beam deflection elements are provided that are fixed by means of a common holder in step (ii).

9. The method in accordance with claim 1, wherein an at least substantially non-transparent starting element is provided in step (i); and wherein a transparency or partial transparency is produced in the functional zone by the deflected processing light beams in step (iv).

10. The method in accordance with claim 9, wherein the transparency or partial transparency is produced by a removal of material by means of the processing light beams in step (iv).

11. The method in accordance with claim 10, wherein the transparency or partial transparency is produced in step (iv) by at least one of laser cutting and laser drilling of an opening in the screening element.

12. The method in accordance with claim 11, wherein an at least substantially transparent carrier having an applied non-transparent layer is provided as the screening element in step (i) and the transparency or partial transparency being produced by an at least partial removal of the non-transparent layer in step (iv).

13. The method in accordance with claim 12, wherein the applied non-transparent layer is a metal layer.

14. The method in accordance with claim 9, wherein an at least substantially transparent carrier having an applied photoresist layer is provided as the screening element in step (i) and the transparency or partial transparency is produced in step (iv) by activation of the photoresist layer and a subsequent removal of the activated photoresist layer by means of a solvent treatment.

15. The method in accordance with claim 14, wherein a photographic film is provided as the screening element in step (i) and the transparency or partial transparency is produced in step (iv) by exposure of the photographic film and optionally by a subsequent development of the photographic film.

16. The method in accordance with claim 1, wherein the processing of the screening element is monitored by an image detection device in step (iii).

17. A method of manufacturing an optoelectronic sensor that has at least one light transmitter or light receiver and at least one optical system, wherein the optical system comprises at least one beam deflection element, at least one diaphragm element, and at least one holder for fixing the beam deflection element and the diaphragm element in a predefined arrangement relative to one another,
  wherein the optical system is manufactured using a method of manufacturing an optical system, wherein
  (i) the beam deflection element and a screening element are provided, wherein a lens array, a combination of a lens array and a lens or a combination of a lens array and a mirror optics is provided as the beam deflection element;
  (ii) the beam deflection element and the screening element are fixed by means of the holder such that the actual arrangement of the screening element relative to the beam deflection element corresponds to the predefined arrangement of the diaphragm element relative to the beam deflection element;
  (iii) the screening element is processed by means of processing light beams to form the diaphragm element; and
  (iv) the beam deflection element is irradiated by the processing light beams such that, after a deflection by the beam deflection element, the processing light beams are incident on a functional zone of the screening element and change the optical properties of the functional zone by energy emission, thereby forming the diaphragm element having a plurality of diaphragm apertures from the screening element.

18. The method in accordance with claim 17,
  wherein the processing of the screening element is carried out in a partially or fully installed state of the optoelectronic sensor; and/or wherein
  the light transmitter or light receiver is screened by a protective element during the processing of the screening element; and in that the protective element is removed when the forming of the diaphragm element has been concluded; and/or wherein
  the light transmitter or the light receiver or a light guide connected to the light transmitter or light receiver is arranged directly at the functional zone of the screening element.

19. An optical system that comprises at least one beam deflection unit, at least one diaphragm element, and at least one holder for fixing the beam deflection element and the diaphragm element in a predefined arrangement relative to one another,
  wherein the optical system is manufactured using a method of manufacturing the optical system of claim 1.

20. An optoelectronic sensor having at least one light transmitter or light receiver and at least one optical system as set forth in claim 19.

* * * * *